United States Patent
Carney

(10) Patent No.: US 9,284,704 B2
(45) Date of Patent: Mar. 15, 2016

(54) DEVICE AND METHOD FOR KEEPING CHANNELS CLEAR OF SILT

(71) Applicant: Gary Richard Carney, Spanish (CA)

(72) Inventor: Gary Richard Carney, Spanish (CA)

(*) Notice: Subject to any disclaimer, the term of this patent is extended or adjusted under 35 U.S.C. 154(b) by 0 days.

(21) Appl. No.: 14/175,186

(22) Filed: Feb. 7, 2014

(65) Prior Publication Data

US 2015/0225915 A1    Aug. 13, 2015

(51) Int. Cl.
*E02B 15/04* (2006.01)
*E02B 5/08* (2006.01)
*E02B 3/02* (2006.01)

(52) U.S. Cl.
CPC .................. *E02B 5/085* (2013.01); *E02B 3/023* (2013.01); *E02B 5/087* (2013.01)

(58) Field of Classification Search
USPC .................. 405/60, 63, 64, 73, 74, 66, 67
See application file for complete search history.

(56) References Cited

U.S. PATENT DOCUMENTS

| 3,653,214 | A | * | 4/1972 | Woody, Jr. | 405/63 |
| 4,100,746 | A | * | 7/1978 | Preus | 405/70 |
| 5,348,419 | A | * | 9/1994 | Bailey et al. | 405/21 |

* cited by examiner

*Primary Examiner* — Sean Andrish
(74) *Attorney, Agent, or Firm* — Elias Borges

(57) ABSTRACT

A method of forming a maintenance free channel is disclosed. The method consists of positioning a plurality of curtain devices along a desired path in a waterway. The curtain devices each consists of an elongated float and an elongated flexible curtain depending from a first side of the elongated float. The elongated curtain has a bottom end with a weight extending along the entire length of the elongated float. The elongated float is configured to be sufficiently buoyant to support the curtain in an upward direction. The length of the elongated float is selected to equal a desired length of the channel. The height of the elongated flexible curtain is selected to be approximately equal to the depth of the waterway such that the elongated weight remains on the bottom while the elongated cylindrical float remains on the surface.

3 Claims, 3 Drawing Sheets

DEVICE AND METHOD FOR KEEPING CHANNELS CLEAR OF SILT

FIELD OF THE INVENTION

The invention relates generally to devices and methods for keeping water channels clear of silt so as to remain navigable.

BACKGROUND OF THE INVENTION

Waterways in rivers or other bodies of water often contain natural channels whose depth is sufficient for safe navigation. Over time, however, natural channels tend to accumulate silt on their bottoms, thereby reducing their depth. Given enough time, river action, tidal action and weather conditions, a channel can become so silted as to render it unfit for navigation. In order to keep channels navigable, dredging is used to reduce the amount of silt on the bottom of the channel. However, do to the action of water currents, dredging requires that a wider area of the channel must be dredged to be effective. As a result, even if the desired channel is only 10 or 20 meters wide, a path 30 meters or more wide would need to be dredged to ensure that the central 10 or 20 meters is clear. In many cases, water currents and tidal action cause the rapid accumulation of silt, necessitating almost annual dredging of the channel. Building walls around the channel would be too expensive, and would likely fail due to hydro-dynamic forces. Therefore, a less expensive and simple method of keeping navigation channels free from silt is required.

SUMMARY OF THE INVENTION

In accordance with one aspect of the present invention, there is provided a method of forming a channel in a waterway having a surface, a depth and a bottom. The channel formed will be self cleaning and not require dredging. The method consists of the steps of providing a fixed channel curtain device and positioning said fixed channel curtain device along a desired path in the waterway. The fixed channel curtain device consists of an elongated cylindrical float having a length and a first side. An elongated flexible curtain depends from the first side of the elongated cylindrical float and extends along the entire length of the elongated cylindrical float. The elongated curtain has a bottom end opposite where the elongated curtain depends from the elongated cylindrical float. An elongated weight is formed on the bottom end of the elongated flexible curtain, the elongated weight extending along the entire length of the elongated cylindrical float. The elongated cylindrical float is configured to be sufficiently buoyant to float the device. The length of the elongated float is selected to equal a desired length of the channel. The height of the elongated flexible curtain is selected to be approximately equal to the depth of the waterway such that the elongated weight remains on the bottom while the elongated cylindrical float remains on the surface.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

Figure 1:
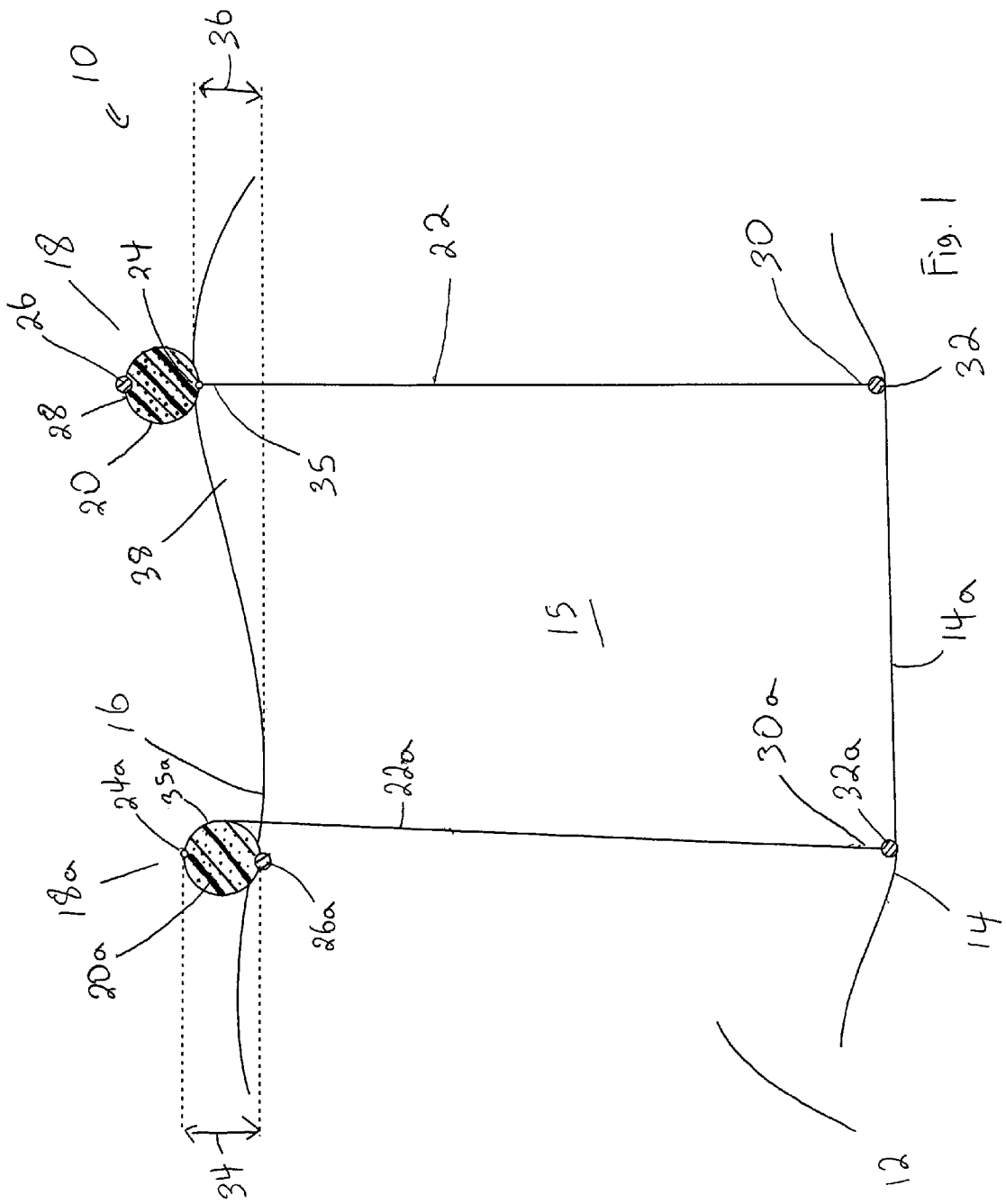
FIG. 1 is a cross sectional view of a channel constructed using the method of the present invention.

Referring firstly to FIG. 1, the present invention is a method and device for forming navigation channels in a waterway. The invention, shown generally as item 10, consists of a pair of fixed channel curtain devices 18 and 18a which are strategically placed in waterway 12. Water way 12 consists of any potentially navigable waterway having a bottom 14 and a surface 16 with a depth between the bottom and surface of sufficient dimension to permit the passage of water vehicles. Fixed channel curtain devices 18 and 18a are placed along waterway 12 parallel to each other to form navigation channel 15. The width of channel 15 is determined by the distance separating curtain devices 18 and 18a. Channel curtain devices 18 and 18a are identical and each consists of an elongated cylindrical float 20 and 20a, respectively, to which a flexible curtain 22 and 22a is attached, respectively. Curtains 22 and 22a depend from an attachment point 24, 24a positioned on one side of floats 20, 20a, respectively. A lower end 30, 30a is formed on curtains 22 and 22a, respectively, to which an elongated weight 32, 32a is attached. Curtain 22, 22a and weights 32, 32a extend the entire length of elongated floats 20, 20a, respectively. Ballast weights 26 and 26a are formed on floats 18, 18a, opposite attachment points 24, 24a, respectively. Ballast weights 26 and 26a are sufficiently heavy so that when floats 18, 18a are floated on water surface 16, the ballast weights will tend to rotate the floats so that the ballast weights are oriented downward, as illustrated with device 18a.

Elongated cylindrical floats 20 and 20a preferably consist of elongated cylinders of expanded polyethylene, as is used in the construction of "pool noodles". Elongated floats 20 and 20a are made as long as may be required (several meters) to be used in the building of navigable channels. Flexible curtains 22 and 22a are preferably made from an artificial fabric material which is inexpensive, strong and resistant to rotting and decay. The fabric need not be waterproof, but it should be a relatively tight fabric capable of resisting the flow of water through the fabric. Several non-woven fabrics commonly used in construction and landscaping applications can be utilized.

Figure 3:
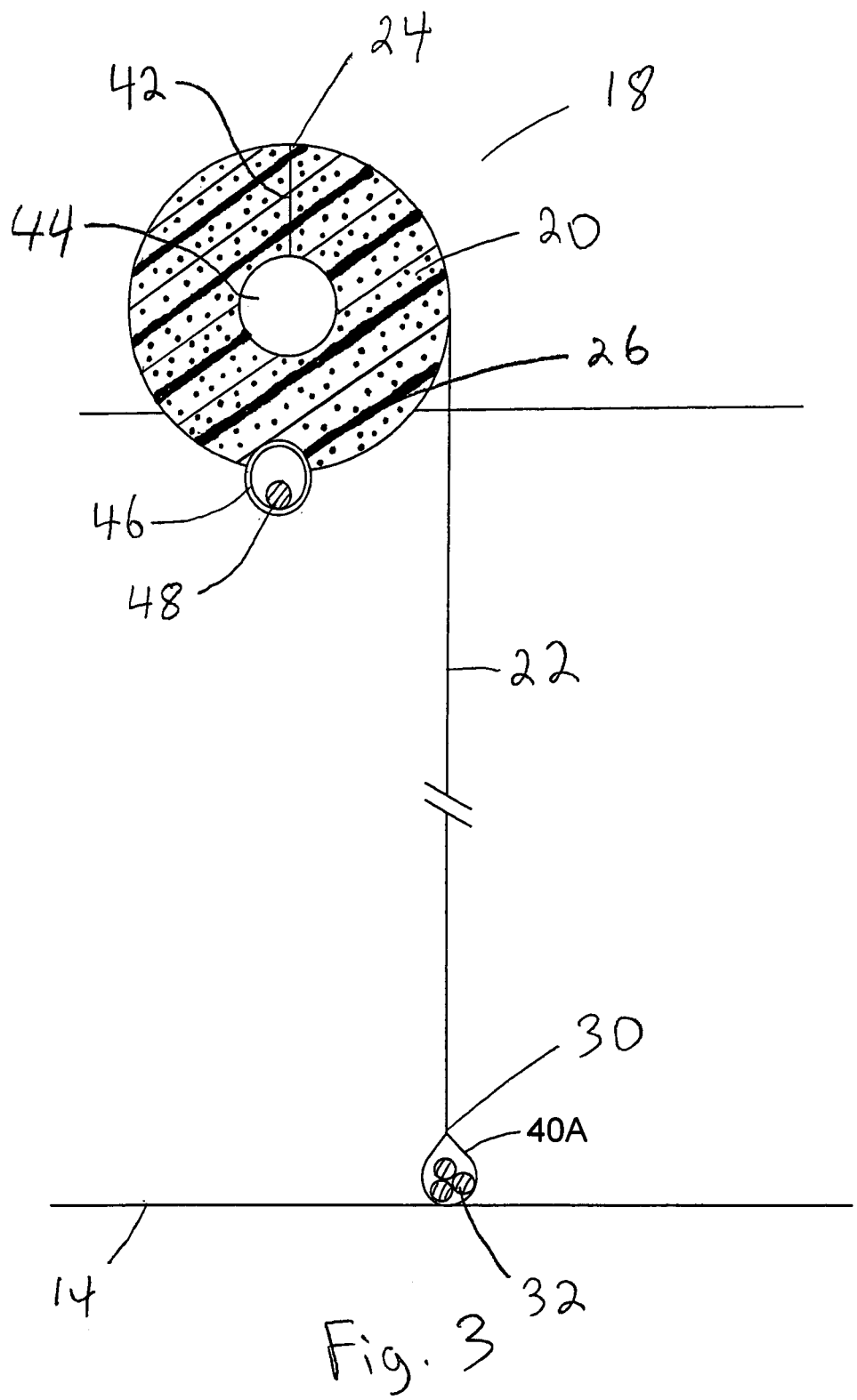
FIG. 3 is a cross sectional view of a curtain device made in accordance with the present invention.

Weights 32 and 32a are formed on bottom ends 30 and 30a of curtains 22 and 22a by means known generally in the art. As best seen in FIG. 3, preferably an elongated pocket 40A is formed on the bottom end of the fabric curtain 22 and the elongated weights are inserted therein. Pocket 40A can be formed by sewing or bonding or by other means known generally in the art. Elongated weight 32 preferably consists of a length of rebar which has been treated to be rust resistant, although any elongated and relatively heavy member may be used. The weight of weight 32 should be large enough to ensure that bottom end 30 of curtain 22 remains at bottom 14, even if water currents or flash floods act on the curtain. If a single piece of rebar is insufficient to anchor device 18 to bottom 14, then as many as three or more individual pieces of rebar can be joined together in a parallel arrangement by the means of bindings (not shown) and used in place of a single rebar weight.

Curtain 22 is secured to float 20 by means known generally in the art. As mentioned above, float 20 may consist of an extra long section of pool noodle, in which case curtain 22 can be secured by forming a slit 42 part way through the noodle to central cavity 44 and then bonding an end of the curtain within the slit. Several suitable waterproof adhesives (such as contact cement) can be used to bond the end of curtain 22 within slit 42. Slit 42 forms attachment point 24 which is positioned on the side of float 20 opposite ballast weight 26. Ballast weight 26 can consist of a length of rebar which is bonded to the surface of float 20 by means known generally in the art. Alternatively, ballast weight 26 can consist of an elongated plastic tube 46 which is bonded to float 20 and which contains a length of rebar 48. Ballast weight 26 should be heavy enough to rotate float 20 such that the ballast weight is submerged and attachment point 24 is clear of the water. Ballast weight 26 should be light enough to ensure that float 20 can float freely and support fabric curtain 22.

Referring back to FIG. 1, positioning attachment point 24 and 24a opposite ballast weight 26 and 26a is an important feature as it ensures that the action of waves (or water level changes) do not cause the curtain to be dislodged from bottom 14. As waves sweep past the elongated floats, the elongated floats will rise and fall. Preferably, the height of curtain 22 and 22a is selected so that the float remains at surface 16. Waves, such as wave 38, will cause floats 20 and 20a to rise and fall as the wave sweeps through. When wave 38 lifts the float, as shown in the case of float 20, the "upper end" 35 of curtain 22 which is partially wrapped around the float is exposed as the float rotates so that weight 26 is oriented upwards. This has the net effect of temporarily increasing the effective length of curtain 22 resulting in less lifting forces being applied to weight 32. Likewise, when wave 38 passes (as is the case with float 20a), the float lowers, causing weight 26a to rotate and effectively wrap upper end 35a of curtain 22a partially around float 20a. This has the effect of shortening curtain 22a. Floats 20 and 20a can therefore rotate in response to waves having an amplitude of 36, which is approximately equal to diameter 34 of the floats. The net effect is that curtain devices 18 and 18a effectively absorb the energy of wave action without transferring it to their anchoring weights. This keeps the floats visible on the surface 16 and also ensures that the anchoring weights are not slowly dislodged as a result of wave action. Furthermore, seasonal changes in water level can be partially compensated for by the rotation of the elongated floats. Again, this keeps the floats visible on the surface while also helping to keep the curtain devices anchored to the bottom of the waterway.

Figure 2:
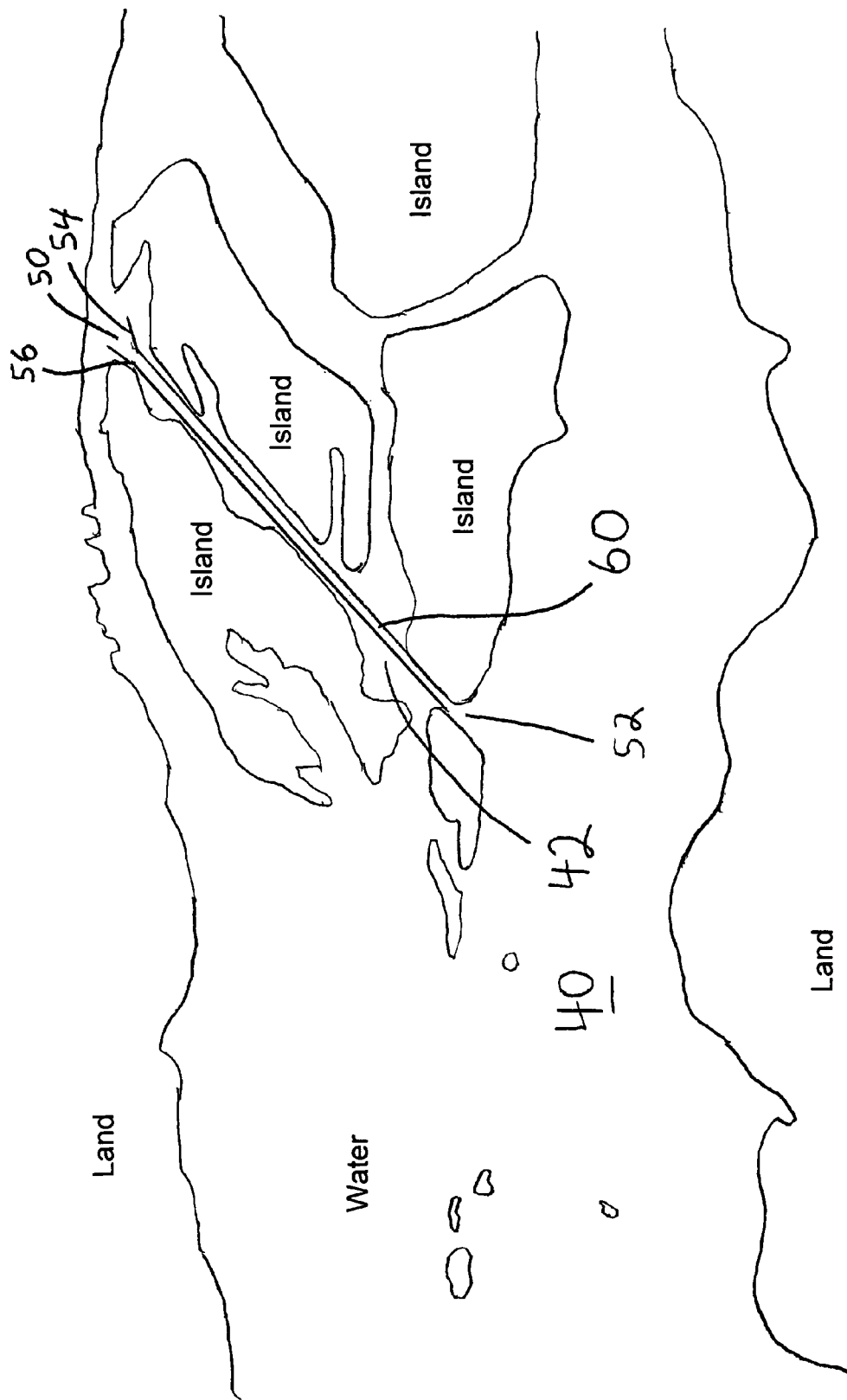
FIG. 2 is a schematic view of channels constructed using the method of the present invention charted on a geographic map of a water way.

Channel 15 is formed by placing curtain devices 18 and 18a in the correct orientation in a waterway. If the orientation of the curtain devices is selected carefully with regards to water currents, it is possible to position the resulting channel such that periodic water currents flow through channel 15 thereby keeping bottom 14a of the channel relatively free of silt. As best seen in FIG. 2, an artificial channel 60 can be formed along a natural channel 42A in waterway 40 by placing a plurality of curtain devices in an end to end arrangement to form parallel chains of curtain devices 55 and 56 through natural channel 42A. Artificial channel 60 will have opposite ends 50 and 52. The positioning of the chains of curtain devices is carefully selected to ensure that a naturally occurring current is formed between ends 50 and 52 which keeps the artificial channel relatively free of silt. Positioning the curtain devices can be done by boat or barge with the ends of adjoining curtain devices being coupled together to form the chain of curtain devices.

The present invention has many advantages. Firstly, the artificial channel formed will be clearly marked by the curtain devices, providing a useful navigational aid to boaters. Since the curtain devices are not rigid structures, no damage will be done to either boat or the curtain device in the event a boat accidentally crosses over the floating portions of the curtain devices. Also, since the flexible curtains are flexible, they can easily withstand storms and waves without causing them to lose their anchorage. Finally, if the orientation and positioning of the chains of curtain devices is carefully selected, a virtually maintenance free permanent channel will result which does not require periodic dredging.

The device of the present invention has other uses. Strategic placement of the devices allows for other applications such as the prevention of river bank erosion, the prevention of lake shore erosion, the containment and control of environmental spills and the protection of fish habitants. Other applications of a shore line or water way conservation nature can be devised for the device.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A device for forming a channel in a water way to prevent the buildup of silt on a bottom of the waterway and for marking the channel on the surface of the waterway, the device comprising:
   a. an elongated cylindrical float having a length and a opposite first and second sides;
   b. an elongated flexible curtain attached to the first side of the elongated cylindrical float along a first attachment line, the elongated flexible curtain depending from the first side of the elongated cylindrical float and extending along the entire length thereof, the elongated curtain having a bottom end opposite where the elongated curtain depends from the elongated cylindrical float;
   c. an elongated weight formed on the bottom end of the elongated flexible curtain, the elongated weight extending along the entire length of the elongated cylindrical float, the elongated cylindrical float being sufficiently buoyant and the elongated flexible curtain having a height being selected to keep the elongated weight at the bottom of the waterway while the elongated cylindrical float is at the surface;
   d. the length of the elongated float selected to form the channel;
   e. an elongated ballast weight formed on the second side of the elongated cylindrical float along a second attachment line opposite the first attachment line, the elongated ballast weight, elongated cylindrical float and the elongated flexible curtain all being configured to permit the elongated cylindrical float to freely rotate between a first position wherein the elongated ballast weight is oriented vertically below the first attachment line, and a second position wherein the first attachment line is oriented vertically below the elongated ballast weight, the elongated ballast weight being sufficiently heavy to bias the elongated float towards the first position of the elongated float.

2. A method of forming a channel in a waterway having a current, a surface, a depth and a bottom, the method comprising the steps of:
   a. providing a fixed channel curtain device comprising:

i. an elongated cylindrical float having a length and a first side;
ii. an elongated flexible curtain depending from the first side of the elongated cylindrical float and extending along the entire length thereof, the elongated curtain having a bottom end opposite where the elongated curtain depends from the elongated cylindrical float;
iii. an elongated weight formed on the bottom end of the elongated flexible curtain, the elongated weight extending along the entire length of the elongated cylindrical float;

b. selecting the length of the elongated float to equal a desired length of the channel;
c. selecting the height of the elongated flexible curtain to be approximately equal to the depth of the waterway such that the elongated weight remains on the bottom while the elongated cylindrical float remains on the surface;
d. placing the fixed curtain device along a desired path channel, the desired path oriented such that the fixed channel curtain device extends coordinate within the current such that the current flows along and parallel to the elongated flexible curtain,
e. wherein the elongated cylindrical float has a second side opposite the first side, the elongated flexible curtain attached to the first side of the elongated cylindrical float along a first attachment line, the elongated flexible curtain, an elongated ballast weight being formed on the second side of the elongated cylindrical float along a second attachment line opposite the first attachment line, the elongated ballast weight, elongated cylindrical float and the elongated flexible curtain all being configured to permit the elongated cylindrical float to freely rotate between a first position wherein the elongated ballast weight is oriented vertically below the first attachment line, and a second position wherein the first attachment line is oriented vertically below the elongated ballast weight, the elongated ballast weight being sufficiently heavy to bias the elongated float towards the first position of the elongated float.

3. The method of claim 2 wherein a pair of fixed channel curtain devices extend parallel to each other along the desired path for the channel, the pair of fixed channel curtain devices being separated by a distance equal to a desired width of the channel, the current running parallel to and between the pair of fixed channel curtain devices.

\* \* \* \* \*